(12) United States Patent
Golla

(10) Patent No.: US 8,095,778 B1
(45) Date of Patent: *Jan. 10, 2012

(54) METHOD AND SYSTEM FOR SHARING FUNCTIONAL UNITS OF A MULTITHREADED PROCESSOR

(75) Inventor: Robert T. Golla, Round Rock, TX (US)

(73) Assignee: Open Computing Trust I & II, San Carlos, CA (US)

( * ) Notice: Subject to any disclaimer, the term of this patent is extended or adjusted under 35 U.S.C. 154(b) by 1411 days.

This patent is subject to a terminal disclaimer.

(21) Appl. No.: 10/880,712

(22) Filed: Jun. 30, 2004

(51) Int. Cl.
*G06F 9/40* (2006.01)

(52) U.S. Cl. ........................................ 712/214

(58) Field of Classification Search ............ 712/214
See application file for complete search history.

(56) References Cited

U.S. PATENT DOCUMENTS

| 5,046,068 | A | | 9/1991 | Kubo et al. |
| 5,185,868 | A | * | 2/1993 | Tran .............................. 712/217 |
| 5,257,215 | A | | 10/1993 | Poon |
| 5,339,266 | A | | 8/1994 | Hinds et al. |
| 5,386,375 | A | | 1/1995 | Smith |
| 5,515,308 | A | | 5/1996 | Karp et al. |
| 5,546,593 | A | | 8/1996 | Kimura et al. |
| 5,619,439 | A | | 4/1997 | Yu et al. |
| 5,745,778 | A | * | 4/1998 | Alfieri .............................. 712/1 |
| 5,954,789 | A | | 9/1999 | Yu et al. |
| 5,987,587 | A | | 11/1999 | Meltzer |
| 6,076,157 | A | | 6/2000 | Borkenhagen et al. |
| 6,088,788 | A | | 7/2000 | Borkenhagen et al. |
| 6,088,800 | A | | 7/2000 | Jones et al. |
| 6,105,127 | A | * | 8/2000 | Kimura et al. ................ 712/215 |
| 6,131,104 | A | | 10/2000 | Oberman |
| 6,212,544 | B1 | | 4/2001 | Borkenhagen et al. |
| 6,282,554 | B1 | | 8/2001 | Abdallah et al. |
| 6,341,347 | B1 | | 1/2002 | Joy et al. |
| 6,349,319 | B1 | | 2/2002 | Shankar et al. |
| 6,357,016 | B1 | | 3/2002 | Rodgers et al. |
| 6,397,239 | B2 | | 5/2002 | Oberman et al. |
| 6,415,308 | B1 | | 7/2002 | Dhablania et al. |
| 6,427,196 | B1 | | 7/2002 | Adiletta et al. |
| 6,434,699 | B1 | | 8/2002 | Jones et al. |
| 6,496,925 | B1 | | 12/2002 | Rodgers et al. |
| 6,507,862 | B1 | | 1/2003 | Joy et al. |
| 6,523,050 | B1 | | 2/2003 | Dhablania et al. |
| 6,564,328 | B1 | | 5/2003 | Grochowski et al. |
| 6,567,839 | B1 | | 5/2003 | Borkenhagen et al. |
| 6,594,681 | B1 | | 7/2003 | Prabhu |

(Continued)

OTHER PUBLICATIONS

Tulsen et al., "Power-sensitive multithreaded architecture," IEEE 2000, pp. 199-206.

(Continued)

*Primary Examiner* — Eddie P Chan
*Assistant Examiner* — John Lindlof
(74) *Attorney, Agent, or Firm* — Robert C. Kowert; Meyertons, Hood, Kivlin, Kowert & Goetzel, P.C.

(57) ABSTRACT

Sharing functional units within a multithreaded processor. In one embodiment, the multithreaded processor may include a multithreaded instruction source that may provide an instruction from each of a plurality of thread groups in a given cycle. A given thread group may include one or more instructions from one or more threads. The arbitration functionality may arbitrate between the plurality of thread groups for access to a functional unit such as a load store unit, for example, that may be shared between the thread groups.

21 Claims, 8 Drawing Sheets

U.S. PATENT DOCUMENTS

| | | |
|---|---|---|
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,728,845 B2 | 4/2004 | Adiletta et al. |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 7,533,248 B1 | 5/2009 | Golla et al. |
| 2002/0046324 A1 | 4/2002 | Barroso et al. |
| 2004/0267855 A1 | 12/2004 | Shantz et al. |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within a Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

Office Action from U.S. Appl. No. 10/881,125 mailed Jul. 28, 2008, 15 pages.

Office Action from U.S. Appl. No. 10/881,125 mailed Dec. 11, 2007, 11 pages.

Office Action from U.S. Appl. No. 10/881,125 mailed Jun. 16, 2006, 12 pages.

Office Action from U.S. Appl. No. 10/881,125 mailed Dec. 27, 2006, 12 pages.

Office Action from U.S. Appl. No. 10/881,125 mailed Jun. 18, 2007, 15 pages.

Ken Slonneger, "Java Operators," May 2000, 1 page.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

FIG. 3

METHOD AND SYSTEM FOR SHARING FUNCTIONAL UNITS OF A MULTITHREADED PROCESSOR

BACKGROUND OF THE INVENTION

1. Field of the Invention

This invention relates to multithreaded processors and, more particularly, to sharing hardware resources between a number of requestors.

2. Description of the Related Art

To continually improve computer system performance, computer processor designs have been improved in a number of ways. Microarchitectures have evolved from single execution unit machines to superscalar designs having multiple pipelines and multiple execution units. To accommodate changing processing environments such as server based applications, for example, a more recent processor design trend includes multithreaded processors capable of executing multiple threads concurrently.

One aspect of multithreading capability may involve providing multiple functional hardware resources for the various threads to use. For example, in a multithreaded processor, different threads may each execute floating point operations or load-store operations. Thus, there may potentially be several types of operations going on in parallel each requesting the functional hardware resources.

SUMMARY

Various embodiments of a method and system for sharing functional units of a multithreaded processor are disclosed. In one embodiment, the multithreaded processor may include a multithreaded instruction source that may provide an instruction from each of a plurality of thread groups in a given cycle. A given thread group may include one or more instructions from one or more threads. The arbitration functionality may arbitrate between the plurality of thread groups for access to a functional unit such as a load store unit, for example, that may be shared between the thread groups.

In another embodiment, a method for sharing a functional unit of a multithreading processor may include a multithreaded instruction source that may be providing an instruction from each of a plurality of thread groups in a given cycle. A given thread group may include one or more instructions from one or more threads. In addition the method may include arbitrating between the plurality of thread groups for access to the functional unit, which may be shared between the plurality of thread groups.

BRIEF DESCRIPTION OF THE DRAWINGS

FIG. 3 is a pipeline diagram illustrating the flow of integer instructions through one embodiment of the core of FIG. 2.

Figure 1:
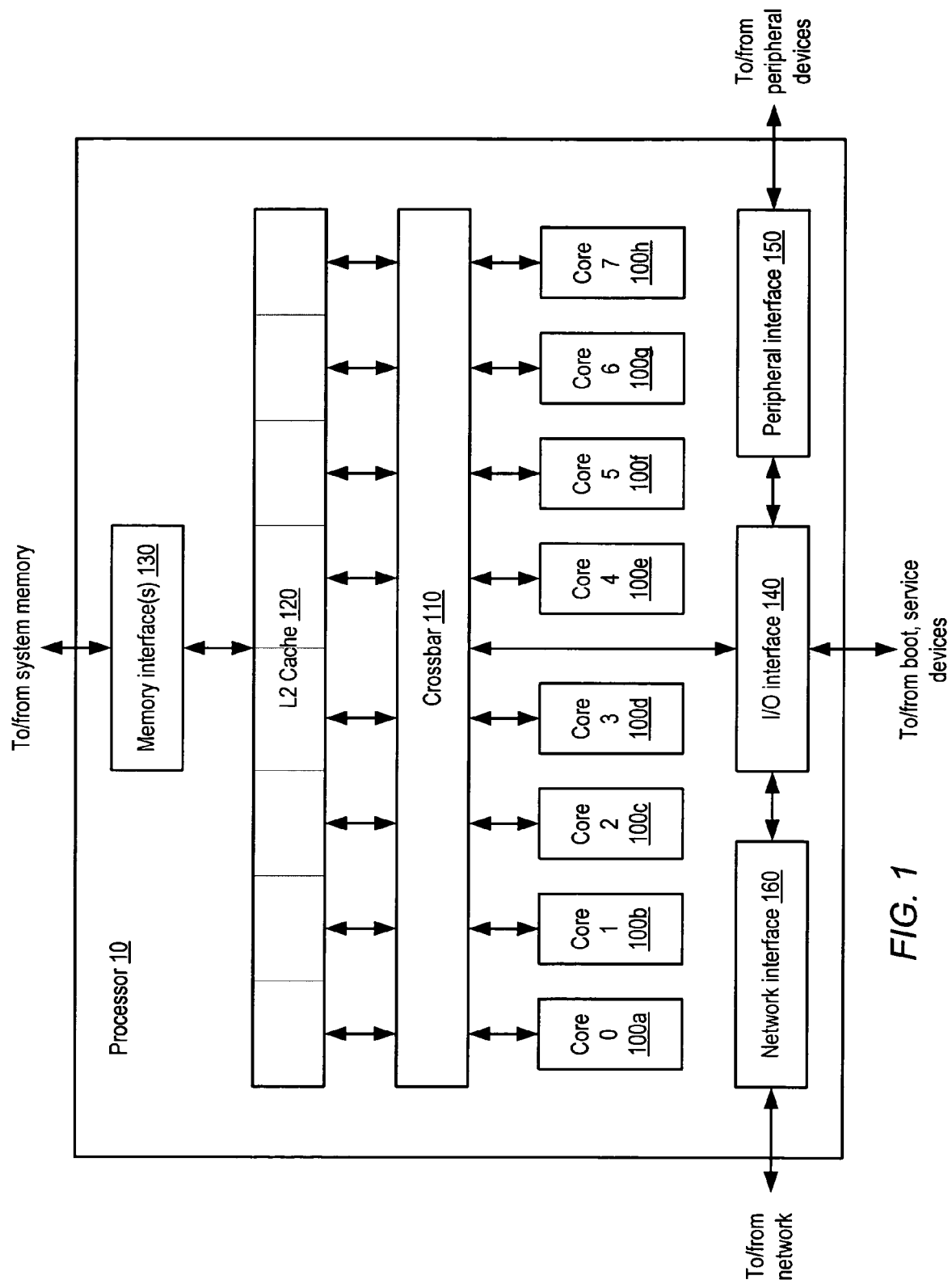
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 5, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100.

Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
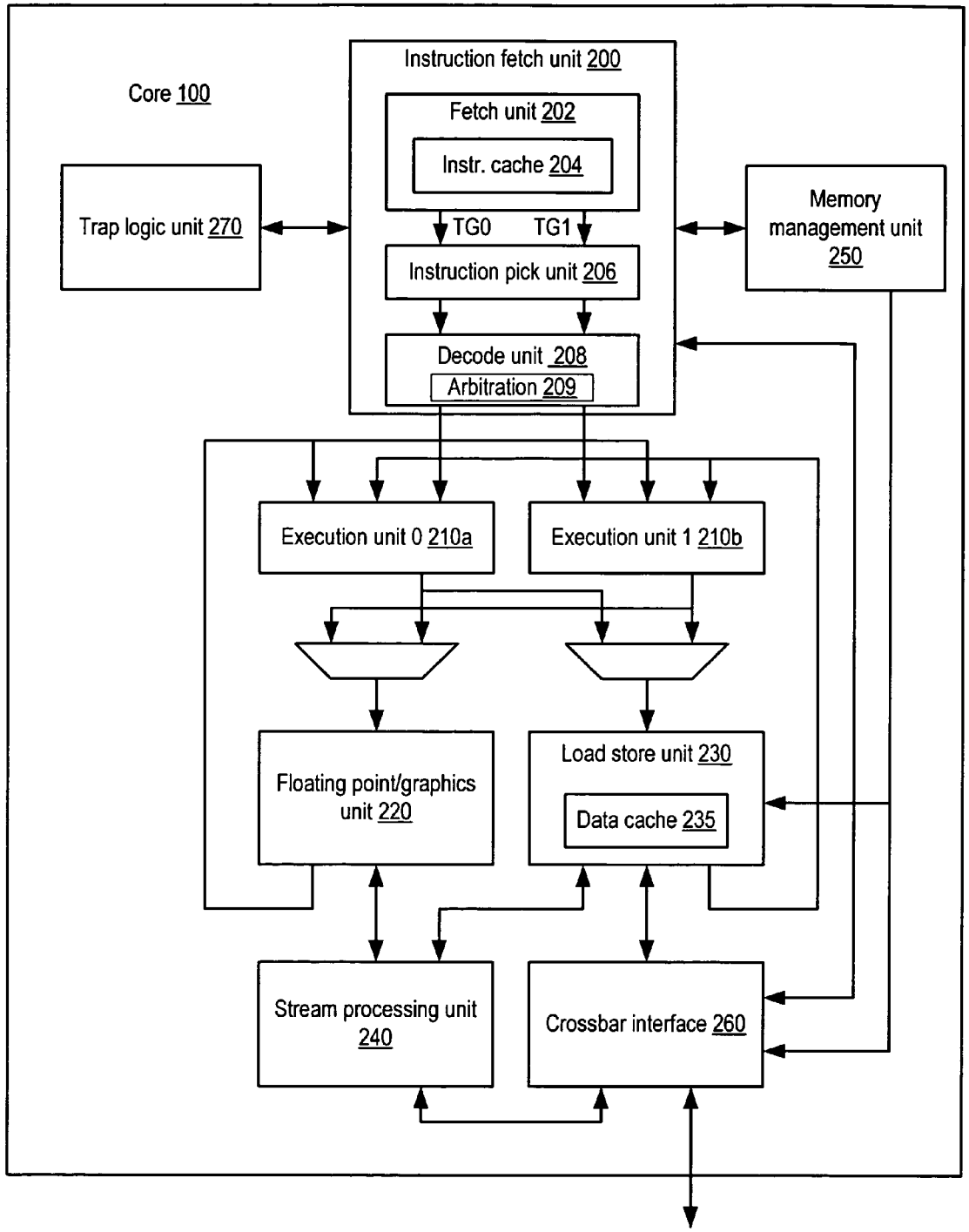
FIG. 2 is a block diagram of one embodiment of a core, as illustrated in FIG. 1, configured to perform fine-grained multithreading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, one FGU 220 and one LSU 230 are provided. In addition, certain instructions may require both the FGU 220 and the LSU 230. Thus, hazards may exist when the instructions from both thread groups picked by pick unit 206 need either FGU 220 or LSU 230 in the same cycle.

As will be described in further detail below in conjunction with the description of FIG. 4 through FIG. 5C, arbitration functionality 209 within decode unit 208 may resolve the scheduling hazards and determine which thread group will use a resource during a given cycle using an arbitration scheme. In one embodiment, some of the scheduling hazards that may be detected and resolved include a store-FGU/store-FGU hazard, a LSU-LSU hazard, and a FGU-FGU hazard. The store-FGU/store-FGU hazard exists when both the TG0 and the TG1 instructions picked by pick unit 206 require the LSU 230 and the FGU 220. The load-load hazard exists when both the TG0 and the TG1 instructions picked by pick unit 206 require the LSU 230 (including all loads and integer stores). The FGU-FGU hazard exists when both the TG0 and the TG1 instructions picked by pick unit 206 require the FGU 220. It is noted that numerous other types of scheduling and resource hazards detectable by decode unit 208 may be possible and are contemplated.

In addition, in some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In addition, as noted above, LSU 230 may execute all floating point loads, since scheduling logic handles them as loads. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Functionality

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Shared Functional Units, Hazard Detection and Arbitration

As described above, pick unit 206 may attempt to select one instruction to schedule for execution from each of TG0 and TG1, such that two instructions may be selected during a given execution cycle. Pick unit 206 may use an LRP algorithm in which the least recently picked thread within a given thread group that is ready for execution is selected. However, since pick unit 206 may not detect all scheduling hazards, pick unit 206 may select an instruction from each of TG0 and TG1 such that both instructions require the use of either FGU 220 or LSU 230 or both during the same cycle. As described above, such selections may constitute hazards. Decode unit 208 may be configured to detect such hazards and may include arbitration functionality that may arbitrate which thread group may use FGU 220 and LSU 230 during a given cycle.

Figure 4:
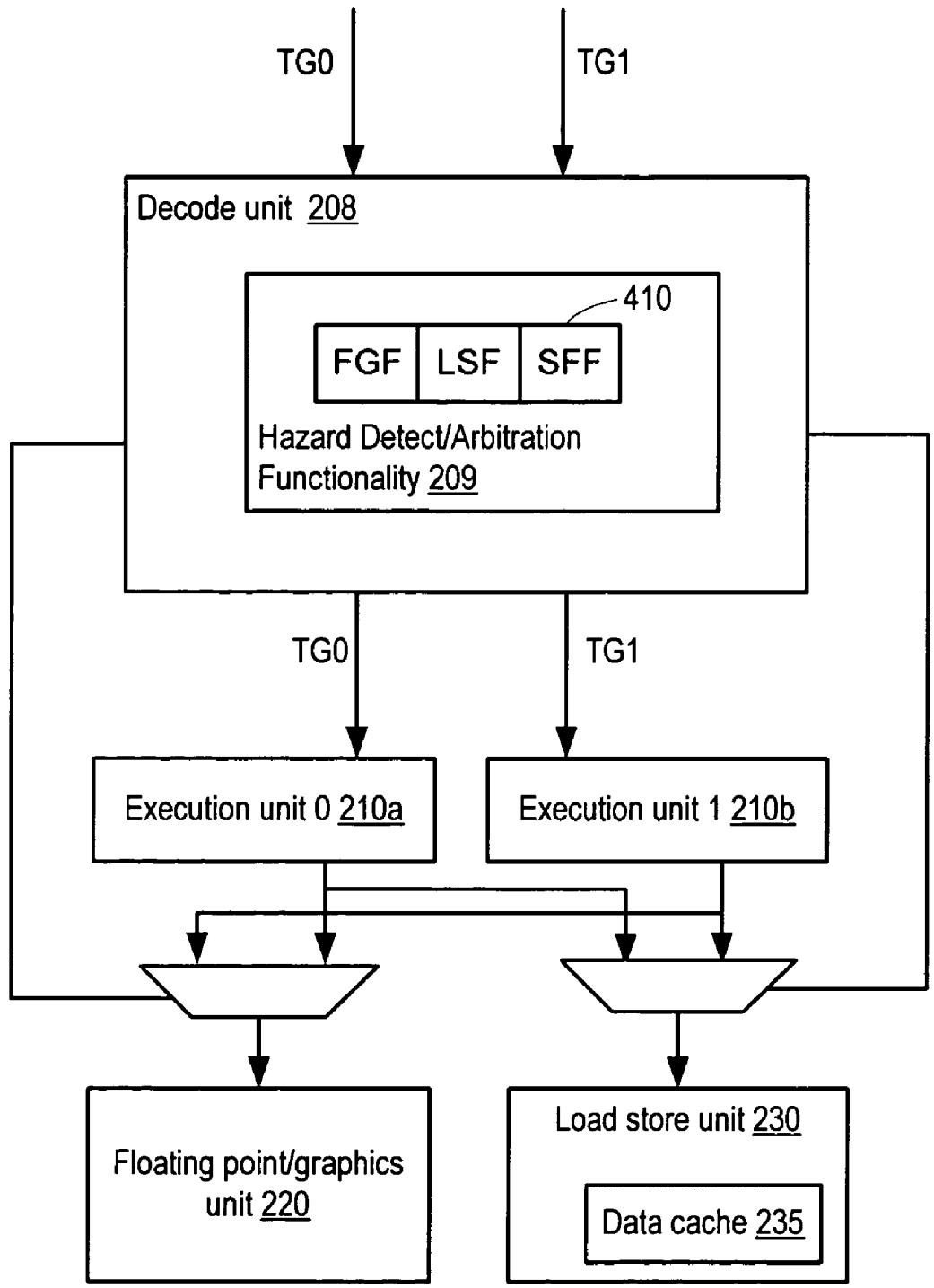
FIG. 4 is a block diagram illustrating aspects of one embodiment of the core of FIG. 2 including arbitration functionality.

FIG. 4 is a block diagram including further aspects of the core 100 shown in FIG. 2. In addition to the functional blocks depicted in FIG. 2, decode unit 208 of FIG. 4 includes hazard detect/arbitration functionality 209, which includes arbitration indicators 410.

As mentioned above, in one embodiment, in a given cycle, only one of the instructions in the thread groups may be scheduled to use a shared resource such as FGU 220 and LSU 230. For example, when two or more threads provide, in a given cycle, instructions for execution using the same resource, (e.g., functional unit) arbitration functionality 209 may be configured to arbitrate between the two or more threads to use the resource. More particularly, when the hazards described above exist, arbitration functionality 209 may be configured to select between TG0 and TG1 to use FGU 220 for FGU instructions, LSU 230 for load instructions and to determine and select which thread may use both FGU 220 and LSU 230 for store-FGU instructions during a given cycle.

In the illustrated embodiment, arbitration indicators 410 includes three indicator (or 'favor') bits. Two of the favor bits are associated with a respective one of the functional units and the third favor bit is associated with both of the functional units. Each favor bit may be set and cleared to indicate preferential selection of instructions from the thread groups based on which thread group has priority. In different terms, each favor bit indicates the least recently used thread group to use the associated functional unit and therefore indicates the thread group that has priority.

Specifically, beginning at the left, the first arbitration indicator bit is a FGU favor bit, FGF that may indicate which of the two thread groups can use FGU 220 if two FGU instructions, one from each thread group, are valid at decode. The second arbitration indicator bit is a LSU favor bit, LSF that may indicate which of the two thread groups can use LSU 230 if two LSU instructions, one from each thread group, are valid at decode. The third bit, is a store-float favor bit, SFF that may indicate which of the two thread groups can use both the FGU 220 and the LSU 230 if two store-FGU instructions, one from each thread group, are valid at decode. As described further below, depending on the implementation, the SFF bit may be used by itself or to break a tie between the FGF bit and the LSF bit when resolving store-FGU/store-FGU hazards.

Thus, hazard detect/arbitration functionality 209 may use the favor bits to determine which of the two thread groups can be scheduled to use the FGU 220 and the LSU 230 in a given cycle. As will be described further below, when a hazard is detected and one of the thread groups is selected using the corresponding favor bit, that favor bit may be modified to indicate that the other (non-selected) thread group has priority the next cycle that a hazard occurs.

In one embodiment, depending on the combination of instructions picked by pick unit 206, decode unit 208 may treat a given combination as one type of hazard in one instance and a different type of hazard in another instance. For example, since decode unit 208 may schedule a load FGU instruction as a load instruction, if a load FGU instruction is decoded in one thread group and a store-FGU instruction is decoded in the other thread group, decode unit 208 may treat this condition as a LSU-LSU hazard. As such, the LSF bit may be used to determine which thread group may use LSU 230. In another example, if a FGU instruction is decoded in one thread group and a store-FGU instruction is decoded in the other thread group, decode unit 208 may treat this condition as a FGU-FGU hazard. In this instance, the FGF bit may be used to determine which thread group may use FGU 220.

The SFF bit is used to prevent a condition known as livelock. Since both FGU 220 and LSU 230 are used by a thread group for the store-FGU instruction, both bits would have to indicate the same thread group during a store-FGU/store-FGU hazard, otherwise the system could lock up. For example, during a store-FGU/store-FGU hazard, it is possible that the FGF bit could be indicating that TG0 has priority while the LSF bit could be indicating that TG1 has priority and vice-versa. When this occurs, to avoid the live-lock condition, arbitration functionality 209 may use the SFF bit to select which thread may use both the FGU 220 and the LSU 230 in a given cycle, effectively breaking the tie between the FGF and LSF bits. Thus, in one embodiment, during a store-FGU/store-FGU hazard, the thread group indicated by the SFF bit may be selected. It is noted however, that in other embodiments, the SFF bit may be used to select a thread group during a store-FGU/store-FGU hazard if the FGF and LSF bits do not indicate that the same thread has priority. In either embodiment, once a thread group is chosen for that cycle, the favor bits that decide the outcome should be modified to indicate that the other (non-selected) thread group has priority the next cycle.

In one embodiment, a favor bit that is set to a '1', indicates that the instruction in TG1 has priority over TG0 for that cycle. A favor bit that is set to a '0', indicates that the instruction in TG0 has priority over TG1 for that cycle. However, it is contemplated that in other embodiments, the indications and the corresponding circuitry may be reversed.

Figure 5A:
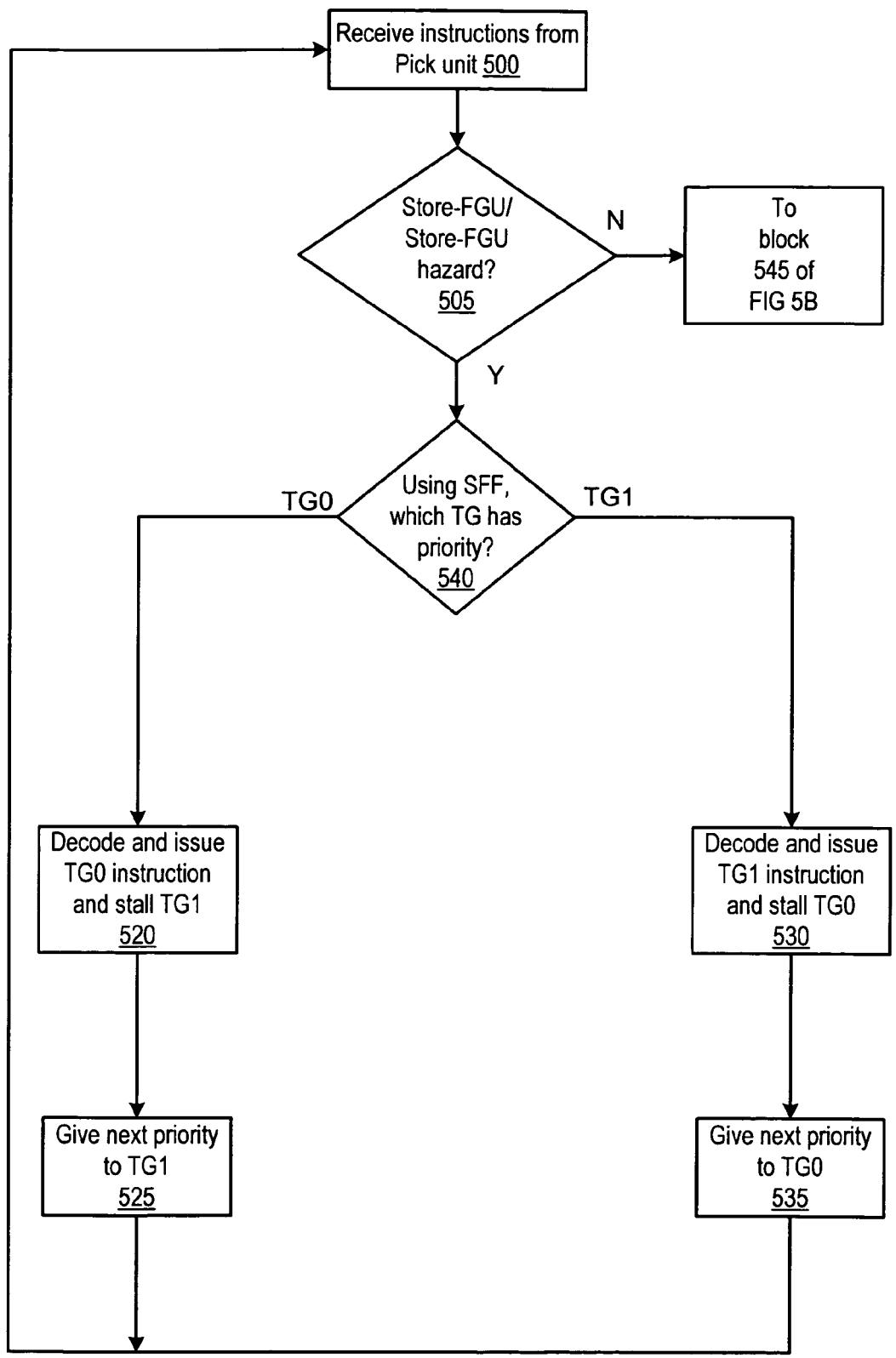
FIGS. 5A-5C are a flow diagrams describing the operation of one embodiment of the core of FIG. 3.
Figure 5B:
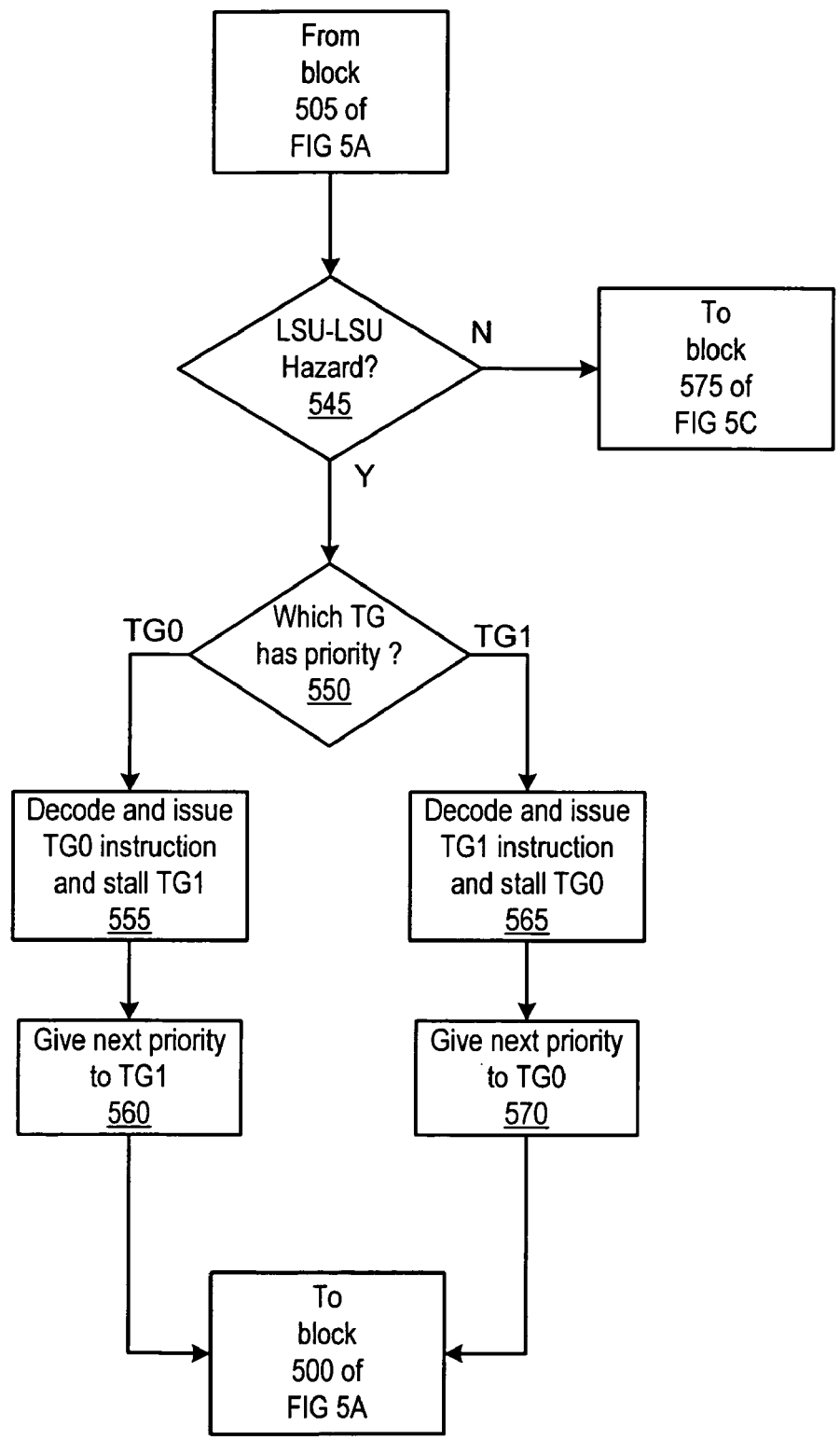
Figure 5C:
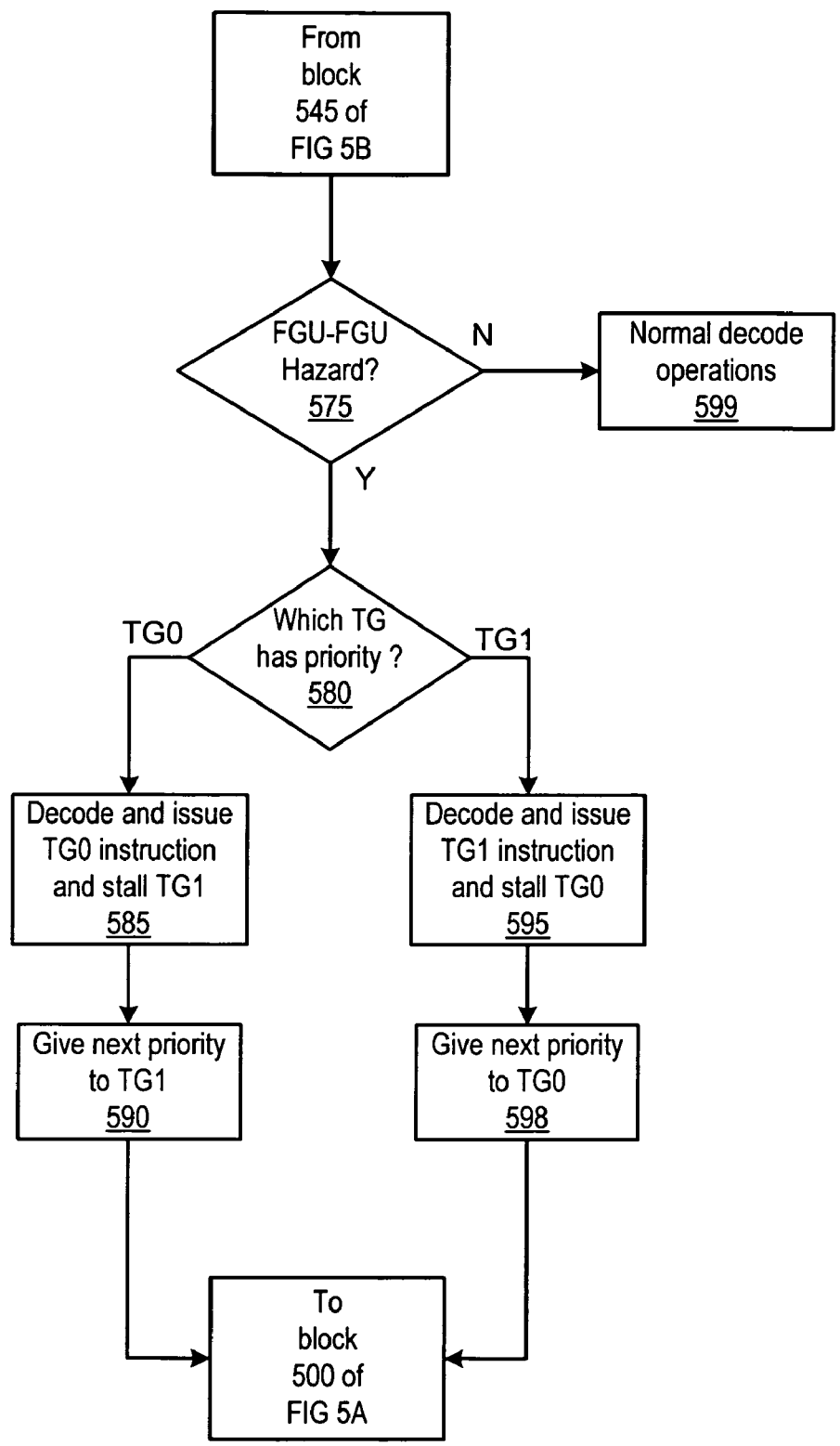

FIG. 5A through FIG. 5C are flow diagrams describing the operation of the arbitration functionality of decode unit 208 of FIG. 2 and FIG. 4. Refer collectively now to FIG. 2, FIG. 4, and FIG. 5A-FIG. 5C. As described above, during operation in the decode pipeline stage, decode unit 208 may decode an instruction from each thread group requiring the use of the same functional unit(s) (e.g., FGU 220 and LSU 230) in the same cycle. In such a case, a decode hazards may exist. Thus, beginning in block 500 of FIG. 5A, decode unit 208 receives instructions from pick unit 206. Hazard detection/arbitration functionality 209 within decode unit 208 may check for a store-FGU/store-FGU hazard (block 505).

If a store-FGU/store-FGU hazard is detected, hazard detection/arbitration functionality 209 within decode unit 208 uses the SFF bit to determine which thread group has priority to use both FGU 220 and LSU 230 (block 540). If the SFF bit is set to a '0', indicating that TG0 has priority, decode unit 208 decodes and issues the store-FGU instruction from TG0 to FGU 220 and LSU 230 (block 520). The store-FGU instruction from TG1 may be stalled for that cycle and may be issued the next available scheduling cycle. Since TG0 has been chosen this cycle, the SFF bit is set to a '1' thereby giving priority to TG1 for the next cycle in which a store-FGU/store-FGU hazard exists (block 525).

Referring back to block 505, if the SFF bit is set to a '1', indicating that TG1 has priority, decode unit 208 decodes and issues the store-FGU instruction from TG1 to FGU 220 and LSU 230 (block 530). In this case, the store-FGU instruction from TG0 may be stalled for that cycle and may be issued the next available scheduling cycle. Since TG1 has been chosen this cycle, the SFF bit is set to a '0' thereby giving priority to TG0 for the next cycle in which a store-FGU/store-FGU hazard exists (block 535).

Referring back to block 505, if hazard detection/arbitration functionality 209 determines that there is no store-FGU/store-FGU hazard. Operation proceeds to block 545 of FIG. 5B. Hazard detection/arbitration functionality 209 within decode unit 208 may check for a LSU-LSU hazard (block 545).

If a LSU-LSU hazard is detected, hazard detection/arbitration functionality 209 checks the status of the LSF bit to determine which thread group has priority this cycle (block 550). If the LSF bit is set to a '0' indicating that TG0 has priority, decode unit 208 decodes and issues the load instruction from TG0 to LSU 230 (block 555). The load instruction from TG1 may be stalled for that cycle and may be issued the next available scheduling cycle. The LSF bit is set to a '1' to indicate that TG1 has priority over TG0 next cycle (block 560).

However, if the LSF bit is set to a '1' indicating that TG1 has priority (block 550), decode unit 208 decodes and issues the load instruction from TG1 to LSU 230 (block 565). Similar to the case described above, the load instruction from TG0 may be stalled for that cycle and may be issued the next available scheduling cycle. The LSF bit is then set to a '0' to indicate that TG0 has priority over TG1 next cycle (block 570). Operation then proceeds as described above in conjunction with block 500 of FIG. 5A.

Referring back to block 545, if hazard detection/arbitration functionality 209 determines that there is no LSU-LSU hazard. Operation proceeds to block 575 of FIG. 5C, where hazard detection/arbitration functionality 209 within decode unit 208 may check for a FGU-FGU hazard (block 575).

If a FGU-FGU hazard is detected, hazard detection/arbitration functionality 209 checks the status of the FGF bit to determine which thread group has priority this cycle (block 580). If the FGF bit is set to a '0' indicating that TG0 has priority, decode unit 208 decodes and issues the FGU instruction from TG0 to FGU 220 (block 585). The FGU instruction from TG1 may be stalled for that cycle and may be issued the next available scheduling cycle. The FGF bit is then set to a '1' to indicate that TG1 has priority over TG0 next cycle (block 590).

However, if the FGF bit is set to a '1' indicating that TG1 has priority (block 580), decode unit 208 decodes and issues the load instruction from TG1 to FGU 220 (block 595). The load instruction from TG0 may be stalled for that cycle and may be issued the next available scheduling cycle. The FGF bit is then set to a '0' to indicate that TG0 has priority over TG1 next cycle (block 598). Operation then proceeds as described above in conjunction with block 500 of FIG. 5A.

Referring back to block 575, if there is no FGU-FGU hazard detected, normal decode of instructions may proceed as described above (block 599).

Using the arbitration scheme described above, the sharing of functional units (e.g., FGU 220 and LSU 230) may be arbitrated between competing thread groups while avoiding live-lock conditions.

It is noted that the arbitration mechanism described above may be scalable to systems with other numbers of thread groups and/or other numbers of shared functional units. For example, in one alternative embodiment the processor core may include more than two thread groups. As such, instead of a single favor bit being used for each type of hazard, a multi-bit encoding or favor bit grouping may be used to indicate which thread group has priority. In a system including up to four thread groups, for example, two favor bits may be used for each type of hazard. Thus, the value of the two bits may be used to determine which thread group has priority. In addition, after a given thread group is given priority the value may be incremented to indicate that the next thread group has priority the next cycle in which a hazard occurs.

In another alternative embodiment, the processor may include additional shared functional units. Accordingly, additional hazards may be present. In such embodiments, the additional functional units may be represented by using additional indicators or favor bit groupings for each additional respective functional unit, as desired.

Exemplary System Embodiment

Figure 6:
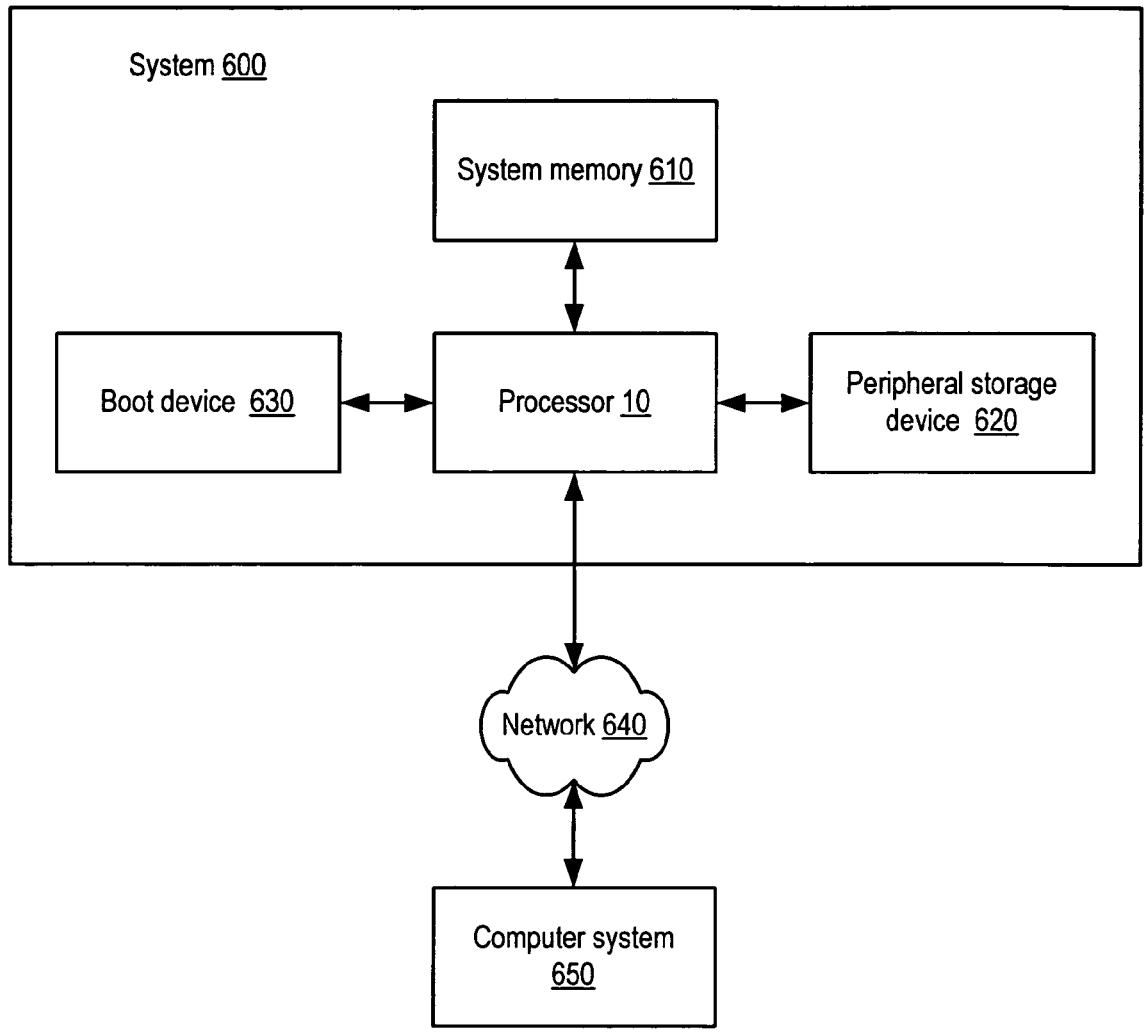
FIG. 6 is a block diagram of one embodiment of a system including a multithreaded processor.

As described above, in some embodiments processor 10 of FIG. 1 may be configured to interface with a number of external devices. One embodiment of a system including processor 10 is illustrated in FIG. 6. In the illustrated embodiment, system 600 includes an instance of processor 10 coupled to a system memory 610, a peripheral storage device 620 and a boot device 630. System 600 is coupled to a network 640, which is in turn coupled to another computer system 650. In some embodiments, system 600 may include more than one instance of the devices shown, such as more than one processor 10, for example. In various embodiments, system 600 may be configured as a rack-mountable server system, a standalone system, or in any other suitable form factor. In some embodiments, system 600 may be configured as a client system rather than a server system.

In various embodiments, system memory 610 may comprise any suitable type of system memory as described above, such as FB-DIMM, DDR/DDR2 SDRAM, or RDRAM®, for example. System memory 610 may include multiple discrete banks of memory controlled by discrete memory interfaces in embodiments of processor 10 configured to provide multiple memory interfaces 130. Also, in some embodiments system memory 610 may include multiple different types of memory.

Peripheral storage device 620, in various embodiments, may include support for magnetic, optical, or solid-state storage media such as hard drives, optical disks, nonvolatile RAM devices, etc. In some embodiments, peripheral storage device 620 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 630 may include a device such as an FPGA or ASIC configured to coordinate initialization and boot of processor 10, such as from a power-on reset state. Additionally, in some embodiments boot device 630 may include a secondary computer system configured to allow access to administrative functions such as debug or test modes of processor 10.

Network 640 may include any suitable devices, media and/or protocol for interconnecting computer systems, such as wired or wireless Ethernet, for example. In various embodiments, network 640 may include local area networks (LANs), wide area networks (WANs), telecommunication networks, or other suitable types of networks. In some embodiments, computer system 650 may be similar to or identical in configuration to illustrated system 600, whereas in other embodiments, computer system 650 may be substantially differently configured. For example, computer system 650 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A multithreaded processor, comprising:
   a processor core configured to concurrently execute instructions from a plurality of thread groups, wherein the processor core includes:
   a multithreaded instruction source configured to provide an instruction from each of the plurality of thread groups in a given processor core execution cycle, wherein a given thread group comprises one or more instructions from one or more threads;
   a functional unit within the processor core and shared between the plurality of thread groups;
   an additional functional unit that is shared between the plurality of thread groups; and
   arbitration functionality configured to arbitrate between the plurality of thread groups for access to the functional unit;
   wherein the arbitration functionality includes a first indicator that is associated with the functional unit and indicates which one of the plurality of thread groups has priority over remaining ones of the plurality of thread groups for access to the functional unit.

2. The multithreaded processor as recited in claim 1, wherein in response to more than one of the plurality of thread groups providing, in the given processor core execution cycle, instructions to be executed by the functional unit, the arbitration functionality is configured to grant to the thread group indicated by the first indictor, access to the functional unit.

3. The multithreaded processor as recited in claim 2, wherein in response to granting the one of the plurality of thread groups access to the functional unit, modifying the first indicator to indicate that a different thread group has priority in a next processor core execution cycle.

4. The multithreaded processor as recited in claim 1, wherein the arbitration functionality includes a second indicator that is associated with the additional functional unit and that indicates which one of the plurality of thread groups has priority over remaining ones of the plurality of thread groups for access to the additional functional unit.

5. The multithreaded processor as recited in claim 4, wherein in response to more than one of the plurality of thread groups providing, in the given processor core execution cycle, instructions to be executed by the additional functional unit, the arbitration functionality is configured to grant to the thread group indicated by the second indictor, access to the additional functional unit.

6. The multithreaded processor as recited in claim 5, wherein in response to granting the one of the plurality of thread groups access to the additional functional unit, modifying the second indicator to indicate that a different thread group has priority in a next processor core execution cycle.

7. The multithreaded processor as recited in claim 4, wherein the arbitration functionality includes a third indicator that is associated with both the functional unit and the additional functional unit and indicates which one of the plurality of thread groups has priority over remaining ones of the plurality of thread groups for access to both the functional unit and the additional functional unit.

8. The multithreaded processor as recited in claim 7, wherein in response to more than one of the plurality of thread groups providing, in the given processor core execution cycle, instructions to be executed by both the functional unit and the additional functional unit, the arbitration functionality is configured to grant to the thread group indicated by the third indictor, access to both the functional unit and the additional functional unit.

9. The multithreaded processor as recited in claim 8, wherein in response to granting the one of the plurality of thread groups access to both the functional unit and the additional functional unit, modifying any of the first indicator, the second indicator and the third indicator to indicate that a different thread group than the one of the plurality of thread groups has priority in a next processor core execution cycle.

10. The multithreaded processor as recited in claim 7, wherein in response to more than one of the plurality of thread groups providing, in the given processor core execution cycle, instructions to be executed by both the functional unit and the additional functional unit, the arbitration functionality is configured to grant to the thread group indicated by the first indicator and the second indicator, access to both the functional unit and the additional functional unit, if both the first indicator and the second indicator indicate the same one of the plurality of thread groups has priority.

11. The multithreaded processor as recited in claim 10, wherein the arbitration functionality is configured to grant to the thread group indicated by the third indictor, access to both the functional unit and the additional functional unit if both the first indicator and the second indicator do not indicate the same one of the plurality of thread groups has priority.

12. The multithreaded processor as recited in claim 11, wherein in response to granting the one of the plurality of thread groups access to both the functional unit and the additional functional unit, modifying any of the first indicator, the second indicator and the third indicator to indicate that a different thread group than the one of the plurality of thread groups has priority in a next processor core execution cycle.

13. A method, comprising:
a processor core of a multithreaded processor executing instructions from a plurality of thread groups;
a multithreaded instruction source within the processor core providing an instruction from each of the plurality of thread groups in a given processor core execution cycle, wherein a given thread group comprises one or more instructions from one or more threads;
arbitrating between the plurality of thread groups for access to a functional unit that is within the processor core and is shared between the plurality of thread groups;
in response to more than one of the plurality of thread groups providing, in the given processor core execution cycle, instructions to be executed by the functional unit, granting one of the plurality of thread groups access to the functional unit in response to a first indicator that is associated with the functional unit indicating that the one of the plurality of thread groups has priority over remaining ones of the plurality of thread groups; and
in response to more than one of the plurality of thread groups providing, in the given processor core execution cycle, instructions to be executed by an additional functional unit that is shared between the plurality of thread groups, granting the one of the plurality of thread groups access to the additional functional unit in response to a second indicator that is associated with the additional functional unit indicating that the one of the plurality of thread groups has priority over remaining ones of the plurality of thread groups.

14. The method as recited in claim 13, further comprising, in response to granting the one of the plurality of thread groups access to the first functional unit, modifying the first indicator to indicate that a different thread group has priority in a next processor core execution cycle.

15. The method as recited in claim 13, further comprising, in response to granting the one of the plurality of thread groups access to the additional functional unit, modifying the second indicator to indicate that a different thread group has priority in a next processor core execution cycle.

16. The method as recited in claim 13, further comprising, in response to more than one of the plurality of thread groups providing, in the given processor core execution cycle, instructions to be executed by both the functional unit and the additional functional unit, granting the one of the plurality of thread groups access to the first and the second functional units in response to a third indicator that is associated with the first and the second functional units indicating that the one of the plurality of thread groups has priority over remaining ones of the plurality of thread groups.

17. The method as recited in claim 16, further comprising, in response to granting the one of the plurality of thread groups access to the first and the second functional units, modifying any of the of the first indicator, the second indicator and the third indicator to indicate that a different thread group than the one of the plurality of thread groups has priority in a next processor core execution cycle.

18. The method as recited in claim 13, further comprising, in response to more than one of the plurality of thread groups providing, in the given processor core execution cycle, instructions to be executed by both the functional unit and the additional functional unit, granting the one of the plurality of thread groups access to both the first and the second functional units in response to both the first indicator and the second indicator indicating the same one of the plurality of thread groups has priority.

19. The method as recited in claim 18, further comprising, in response to more than one of the plurality of thread groups providing, in the given processor core execution cycle, instructions to be executed by both the functional unit and the additional functional unit, granting the one of the plurality of thread groups access to both the first and the second functional units in response to the third indicator indicating that the one of the plurality of thread groups has priority over remaining ones of the plurality of thread groups, if both the first indicator and the second indicator are not indicating the same one of the plurality of thread groups has priority.

20. The method as recited in claim 19, further comprising, in response to granting the one of the plurality of thread groups access to both the functional unit and the additional functional unit, modifying any of the first indicator, the second indicator and the third indicator to indicate that a different thread group than the one of the plurality of thread groups has priority in a next processor core execution cycle.

21. A system, comprising:
a system memory;
a multithreaded processor coupled to the system memory, wherein the multithreaded processor includes:
a processor core configured to concurrently execute instructions from a plurality of thread groups, wherein the processor core includes:
a multithreaded instruction source configured to provide an instruction from each of the plurality of thread groups in a given processor core execution cycle, wherein a given thread group comprises one or more instructions from one or more threads;
a functional unit within the processor core and shared between the plurality of thread groups;
an additional functional unit that is shared between the plurality of thread groups; and
arbitration functionality configured to arbitrate between the plurality of thread groups for access to the functional unit
wherein the arbitration functionality includes a first indicator that is associated with the functional unit and indicates which one of the plurality of thread groups has priority over remaining ones of the plurality of thread groups for access to the functional unit.

* * * * *